(12) United States Patent
Bhagat

(10) Patent No.: US 11,609,564 B2
(45) Date of Patent: Mar. 21, 2023

(54) OPTIMIZING MANAGEMENT OF AUTONOMOUS VEHICLES

(71) Applicant: MITSUBISHI ELECTRIC CORPORATION, Tokyo (JP)

(72) Inventor: Akshay Bhagat, Canton, MI (US)

(73) Assignee: Mitsubishi Electric Corporation, Tokyo (JP)

(*) Notice: Subject to any disclaimer, the term of this patent is extended or adjusted under 35 U.S.C. 154(b) by 110 days.

(21) Appl. No.: 17/110,966

(22) Filed: Dec. 3, 2020

(65) Prior Publication Data

US 2022/0179409 A1  Jun. 9, 2022

(51) Int. Cl.
G05D 1/00 (2006.01)
H04W 4/44 (2018.01)
G08G 1/127 (2006.01)

(52) U.S. Cl.
CPC ......... *G05D 1/0016* (2013.01); *G05D 1/0027* (2013.01); *G05D 1/0038* (2013.01); *G08G 1/127* (2013.01); *H04W 4/44* (2018.02)

(58) Field of Classification Search
CPC .. G05D 1/0016; G05D 1/0027; G05D 1/0038; H04W 4/44; G08G 1/127
See application file for complete search history.

(56) References Cited

U.S. PATENT DOCUMENTS

| | | | |
|---|---|---|---|
| 6,646,568 B2 | 11/2003 | MacPhail et al. | |
| 9,488,979 B1 | 11/2016 | Chambers et al. | |
| 2017/0092030 A1* | 3/2017 | Badger, II | B60R 25/102 |
| 2017/0212511 A1 | 7/2017 | Paiva Ferreira et al. | |
| 2017/0365170 A1 | 12/2017 | Lazic et al. | |
| 2019/0259277 A1 | 8/2019 | Dudar | |
| 2020/0143683 A1 | 5/2020 | Maruiwa et al. | |
| 2020/0387278 A1* | 12/2020 | Strandberg | G06F 3/0488 |
| 2021/0192962 A1* | 6/2021 | Bristow | G08G 5/0069 |
| 2022/0063665 A1* | 3/2022 | Golgiri | B60K 35/00 |

FOREIGN PATENT DOCUMENTS

| | | |
|---|---|---|
| JP | 2019-21200 A | 2/2019 |
| JP | 2019-133282 A | 8/2019 |
| WO | WO-2005093538 A1 * 10/2005 | ........... G05D 1/0027 |

OTHER PUBLICATIONS

Mehdi Nourinejad et al., "Designing parking facilities for autonomous vehicles", Transportation Research Part B, Feb. 3, 2018, pp. 110-127, vol. 109.
Communication dated Aug. 16, 2022, issued in Japanese Application No. 2020-215250.

* cited by examiner

*Primary Examiner* — Anne Marie Antonucci
*Assistant Examiner* — Jingli Wang
(74) *Attorney, Agent, or Firm* — Sughrue Mion, PLLC; Richard C. Turner

(57) ABSTRACT

A system, device and method of managing autonomous vehicles are provided. The system may include a server, a feedback device, a control device for controlling a vehicle. A server may include a communication interface configured to communicate with a control device of each of a plurality of vehicles and a feedback device; a memory storing instructions; and at least one processor. The at least one processor is configured to receive control data from the control device of each of the plurality of vehicles; determine an operation status of each of the plurality of vehicles based on the control data; generate a feedback interface based on the operation status of each of the plurality of vehicles; and transmit the feedback interface to the feedback device.

20 Claims, 10 Drawing Sheets

OPTIMIZING MANAGEMENT OF AUTONOMOUS VEHICLES

BACKGROUND

1. Technical Field

The disclosure relates to the field of autonomous driving technology, and in particular, to a system and a method of managing autonomous vehicles in a parking space or a distribution center with a safety back-up.

2. Description of Related Art

With the continuous development of autonomous vehicles, a framework for optimizing and managing autonomous vehicles is also evolving. While autonomous vehicles may be managed in a distributed manner, that is, each vehicle controlling its own affairs independent of another vehicle, with the deployment of numerous autonomous vehicles in certain places, it is necessary to have a centralized management system for overseeing and controlling operations of each vehicle. Such a centralized management system will allow vehicles to be effectively and safely managed in a parking lot or a distribution center.

The existing parking controllers are configured such that instructions for controlling the vehicles are automatically executed even when these instructions may not be accurate under certain circumstances. Due to such an automatic execution of inaccurate instructions, the vehicle and other objects may be damaged, and may pose a safety risk for people. In addition, the existing parking controllers lack a user-friendly interface in which a driver can reject centralized control commands from a server, or an interface in which a third person (e.g., a safety operator) can intervene in an automatic execution of commands to promote safe operation of the autonomous vehicles.

Therefore, there is a need for a centralized management system that efficiently and safely manages autonomous vehicles in parking spaces and distribution centers, and that provides user-friendly interfaces to execute or reject control commands to the vehicles.

SUMMARY

The disclosure provides a system and a method of managing autonomous vehicles in parking spaces and distribution centers, and for providing user-friendly interfaces to execute or reject control commands of the vehicles.

In accordance with an aspect of the disclosure, there is provided a feedback device including: a display; a communication interface configured to communicate with a server and a control device of each of a plurality of vehicles; and a processor configured to: receive a feedback interface from the server, control the display to display the feedback interface; receive a user input on the feedback interface; and transmit a control command corresponding to the user input to the control device of each of the plurality of vehicles.

The feedback interface includes an image of at least one vehicle among the plurality of vehicles.

The feedback interface further includes images of one or more components of the at least one vehicle.

The feedback interface further includes an operation status of the one or more components of the at least one vehicle.

The feedback interface further includes a metric for the one or more components of the at least one vehicle.

The image of the at least one vehicle is a top-view of the at least one vehicle.

The feedback interface activates or deactivates one or more interfaces based on a heartbeat signal indicating an operating status of the one or more components of the at least one vehicle.

The feedback interface activates or deactivates one or more interfaces based on the control command being executed by the control device of each of the plurality of vehicles.

The feedback interface configures one or more interfaces to blink based on a latency of transmitting the control command.

The feedback interface further includes a map view of the plurality of vehicles.

In accordance with an aspect of the disclosure, there is provided a method of controlling a feedback device connected to a server. The method includes: receiving a feedback interface from the server; controlling a display to display the feedback interface; receiving a user input on the feedback interface; and transmitting a control command corresponding to the user input to a control device of each of a plurality of vehicles.

The feedback interface includes images of one or more components of the at least one vehicle.

The feedback interface further includes an operation status of the one or more components of the at least one vehicle.

The feedback interface activates or deactivates one or more interfaces based on a heartbeat signal indicating an operating status of the one or more components of the at least one vehicle.

The feedback interface activates or deactivates one or more interfaces based on the control command being executed by the control device of each of the plurality of vehicles.

The feedback interface configures one or more interfaces to blink based on a latency of transmitting the control command.

In accordance with an aspect of the disclosure, there is provided a server including: a communication interface configured to communicate with a control device of each of a plurality of vehicles and a feedback device; a memory storing instructions; and at least one processor. The at least one processor is configured to: receive control data from the control device of each of the plurality of vehicles; determine an operation status of each of the plurality of vehicles based on the control data; generate a feedback interface based on the operation status of each of the plurality of vehicles; and transmit the feedback interface to the feedback device.

The at least one processor is configured to execute: a priority module configured to determine a priority of each of the plurality of vehicles to be moved; a path minimization module configured to minimize a path distance for each of the plurality of vehicles from a first location to a second location; and a time scheduling module configured to obtain a schedule delivery time for each of the plurality of vehicles and determine a schedule time to be deployed for each of the plurality of vehicles.

The control data includes at least one of vehicle data, positioning data or sensor data.

The priority module is further configured to assign the priority of the plurality of vehicles based on at least one of an urgency of an item being carried in a vehicle, a duration of the item carried in the vehicle, or a maximum time for delivery assigned to the item or a passenger in the vehicle.

BRIEF DESCRIPTION OF THE DRAWINGS

The above and/or other aspects, features, and advantages of certain embodiments of the disclosure will be apparent from the following description taken in conjunction with the accompanying drawings, in which.

DETAILED DESCRIPTION

Figure 1:
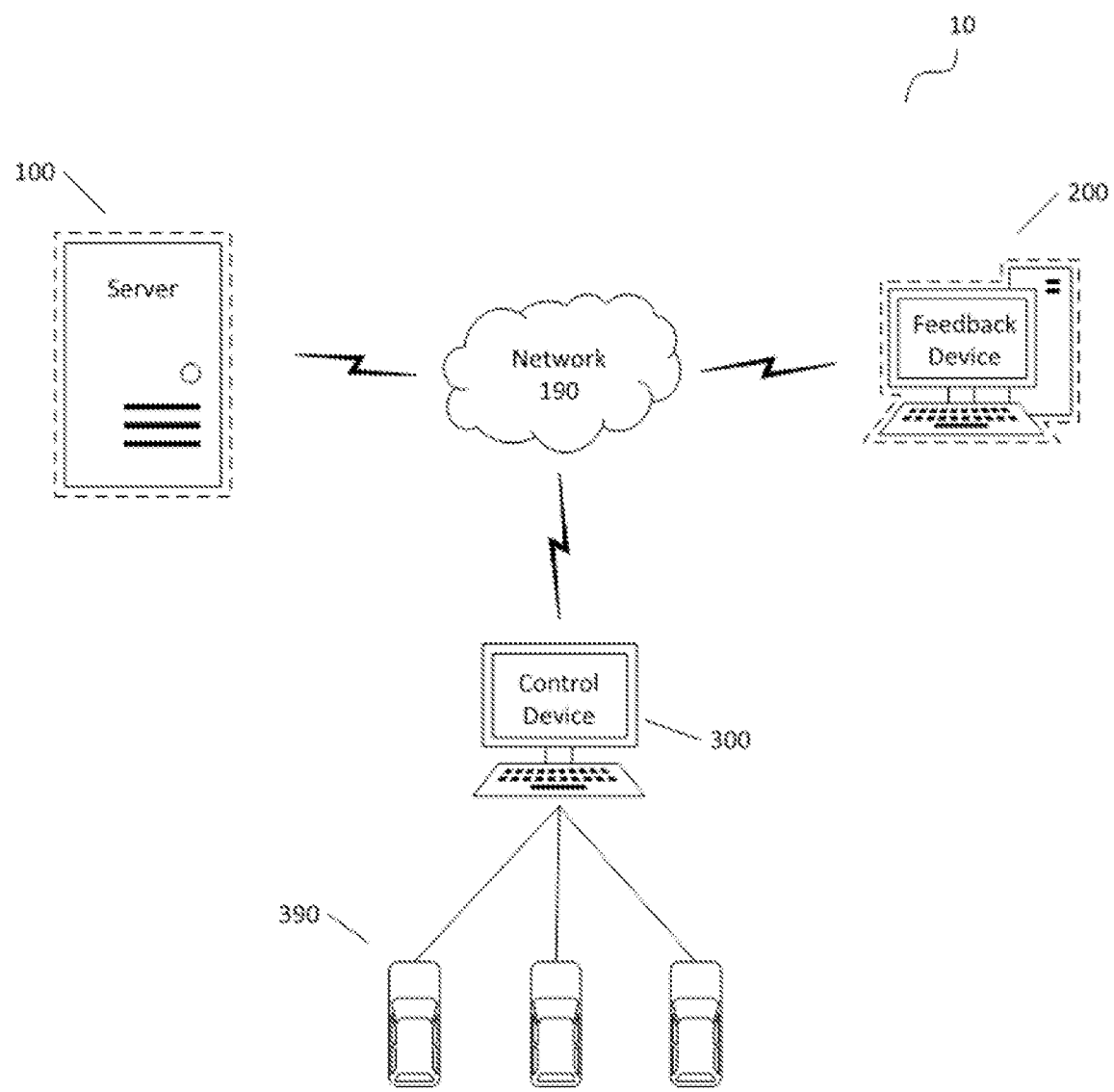
FIG. 1 is a diagram illustrating a central management system for managing autonomous vehicles according to an embodiment.

Embodiments of the disclosure will be described in detail with reference to the accompanying drawings. The same reference numerals used in the drawings may identify the same or similar elements. The terms used in the disclosure should not be strictly construed as defined in the disclosure, but should be construed as those one of ordinary skilled in the art would understand in the context of the disclosure. Hereinafter, embodiments of the disclosure will be described with reference to the accompanying drawings. However, it should be noted that the embodiments of the disclosure may be in different forms and are not limited to the embodiments of the disclosure set forth herein.

FIG. 1 is a diagram illustrating a central management system for managing autonomous vehicles according to an embodiment.

Referring to FIG. 1, a central management system 10 for managing autonomous vehicles may include a server 100, a feedback device 200, a control device 300, a network 190 and a plurality of autonomous vehicles 390. The server 100, the feedback device 200 and the control device 300 may be connected to each other through the network 190. The control device 300 may be implemented in each of the plurality of autonomous vehicles 390. The feedback device 200 and the control device 300 may be any computing device, including a desktop computer, a laptop, a work station, a mobile computing device, etc. The server 100 may be a cloud server, and may be implemented as an independent server or as a server cluster including a plurality of servers.

The network 190 may include wired and/or wireless communication networks, and may include any number of networks. The network 190 may exchange data in circuit-switched and/or packet-switched channels. For example, the networks 190 may include telecommunication networks, local area networks, wide area networks, WiFi networks, and/or the Internet.

Figure 2:
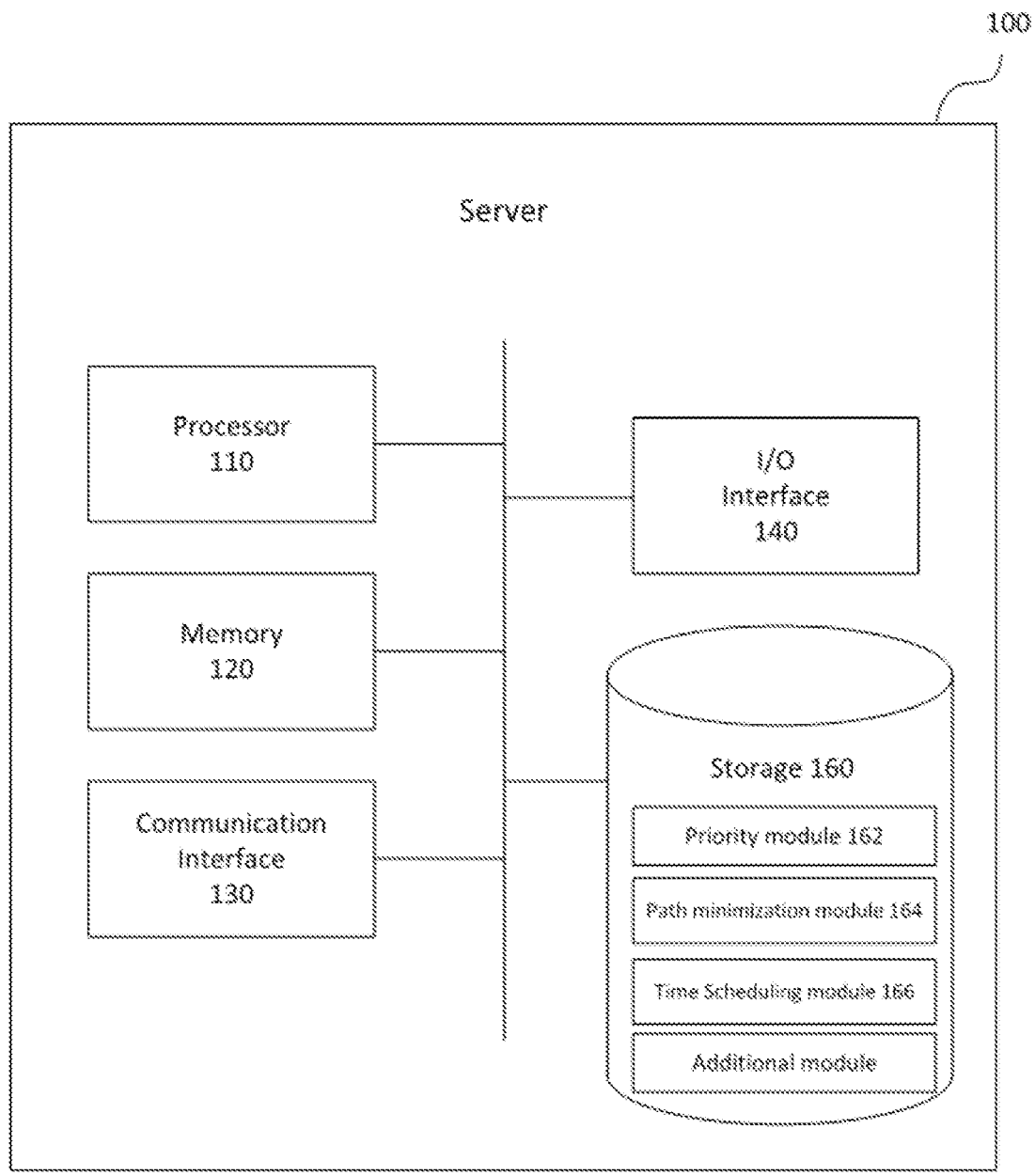
FIG. 2 is a diagram illustrating a server of a central management system according to an embodiment.

FIG. 2 is a block diagram illustrating a server for controlling autonomous vehicles according to an embodiment.

The server 100 may include a processor 110, a memory 120, a communication interface 130, an input/output interface 140, and a storage 160. The feedback device 200 (shown in FIG. 4) may include a processor 210, a memory 220, a communication interface 230, an input/output interface 240, a display 250, and a storage 260. The control device 300 (shown in FIG. 6) may include a processor 310, a memory 320, a communication interface 330, an input/output interface 340, a display 360 and a storage 360. As set forth above, the components or elements of the server 100, the feedback device 200, and the control device 300) may be configured to perform the same or similar functions. Therefore, for the convenience of description, the components of the server 100 will be mainly described herein.

Referring to FIG. 2, the processor 110 may control an overall operation of the server 100. Specifically, the processor 110 may be connected to and configured to control the operations of the memory 120, the communication interface 130, the input/output interface 140 and the storage 160. The processor 110 may be implemented according to various embodiments. For example, the processor 110 may be implemented as at least one of an application specific integrated circuit (ASIC), an embedded processor, a microprocessor, hardware control logic, a hardware finite state machine (FSM), a digital signal processor (DSP), a neural network processor (NPU), or the like. The processor 110 may include a central processing unit (CPU), a graphic processing unit (GPU), and a main processing unit (MPU), or the like. In addition, the processor 110 may include one or more processors.

The memory 120 may store at least one instruction and various software programs or applications for operating the server 100 according to the embodiments of the disclosure. For example, the memory 120 may include a semiconductor memory, such as a flash memory, a magnetic storage medium such as a hard disk, or the like. The memory 120 may refer to any volatile or non-volatile memory, a read-only memory (ROM), a random access memory (RAM) communicatively coupled to the processor 110 or a memory card (e.g., a micro SD card, a memory stick) connectable to the server 100. The memory 120 may store various software modules or codes for operating the server 100, and the processor 110 may control the operations of the server 100 by executing various software modules that are stored in the memory 120. That is, the memory 120 may be accessed by the processor 110 to perform data reading, recording, modifying, deleting, updating or the like. Further, the memory 120 may store executable instructions, code, data objects etc.

The communication interface 130 may include circuitry or an interface that is configured to communicate with an external device (e.g., a feedback device 200 or a control device 300) through the network 190. The communication interface 130 may include at least one of a Wi-Fi module, a Bluetooth module, a wireless communication module, or a near field communication (NFC) module. Specifically, the Wi-Fi module may communicate by a Wi-Fi method and the Bluetooth module may communicate by a Bluetooth method. When using the Wi-Fi module or the Bluetooth module, various connection information such as service set identifier (SSID) may be transmitted and received for communication connection and then various information may be transmitted and received through the communication interface 130.

The input/output interface 140 may be configured to receive an input from a user or other devices, and the processor 110 may receive a user command for controlling the operations of the server 100 through the input/output interface 140. The input/output interface 140 may include, for example, a microphone, a camera, a remote controller, a keyboard, a mouse, or the like.

The storage 160 may be configured to store various program, application, instructions, modules, code, models, data object, etc. for computing various data related to managing autonomous vehicles. Here, the storage 160 may be provided in the form of a non-transitory storage medium that is a tangible device that may not include a signal (e.g., electromagnetic wave). In particular, the storage 160 may store a priority module 162, a path minimization module 164 and a time scheduling module 166. However, one or more embodiments of the disclosure are not limited thereto, and the storage 160 may include any other module that is relevant to managing autonomous vehicles. Furthermore, these modules may be temporarily stored in the memory 120 to be processed by the processor 110.

The priority module 162 may be configured to determine a priority of each of a plurality of autonomous vehicles 390 and reorder the vehicle movement in a parking space or a distribution yard. Here, each vehicle may be assigned a vehicle ID, and the priority may be linked to the vehicle ID. By way of example, the priority may be assigned to each vehicle based on urgency of an item being carried in a vehicle, a duration of an item carried in the vehicle and/or a maximum time for delivery assigned to an item or a passenger (e.g., an emergency patient). Based on the weights and predetermined thresholds assigned to each condition, one vehicle may be prioritized over another vehicle to be moved from one location to another. When a vehicle satisfies a predetermined threshold assigned to a certain condition, an urgency flag may be activated for the vehicle to be prioritized over other vehicles in the parking lot or the distribution center.

The path minimization module 164 may be configured to compute a distance between a start point to a target destination of the vehicle and minimize a path distance of the vehicle. For example, the path minimization module 164 may compute a plurality of available routes between the start point and the target destination of the vehicle and select one of the plurality of routes that minimizes the path distance between the start point and the target destination. The priority of each vehicle may be considered in terms of calculating a minimum distance for each vehicle. For example, the path minimization module 164 may be optimized by selecting a shorter path for a higher priority vehicle. Specifically, in an equation for calculating a minimum path distance of each vehicle, a priority assigned to each vehicle may be used as multipliers for parameters in the equation. In addition, an energy threshold flag may be implemented in the same equation described above and may be used as an exponential multiplier for vehicles with lower priorities.

The time scheduling module 166 may be configured to schedule a delivery time of each vehicle. For example, the time scheduling module 166 may obtain a scheduled delivery time of an object (e.g., an item or a passenger) being carried in each vehicle and schedule a time for each vehicle to be deployed. Here, the time scheduling for delivery may integrate concepts such as "Just in Time" (JIT) to improve manufacturing efficiency, and to reduce a storage space and inventory amortization costs.

While some example modules are described above, one or more embodiments of the disclosure are not limited thereto. The server 100 may be configured to implement other modules in order to optimize the management of autonomous vehicles. For example, one or more additional modules may be configured to extract geometry data of a parking space when a vehicle enters the parking space, and the extracted geometry data may be used to optimize a spatial usage in which all the vehicles may be fitted in a limited space of a parking lot. Furthermore, the one or more additional modules may be configured to implement an order of retrieval concept in which the priority and urgency values can be accounted for in calculating a time for retrieval, and the vehicles may be retrieved according to the calculated time for retrieval. Also, in addition to adopting First-In First-Out (FIFO) for managing autonomous vehicles in a parking space, a unique revolving priority number may be assigned to each vehicle so as to determine a specific retrieval order for each vehicle.

Furthermore, the server 100 may include one or more additional modules that may be configured to compute various solutions considering factors, such as latency and a vehicle emergency. Here, the term "solution" may mean a next course of action to be taken by certain part of component of a vehicle. Latency may be occur as solutions for vehicle actions are being computed in the server 100 (e.g., cloud server), and as the computed solutions are being transmitted to the respective vehicles. Therefore, latency may be taken into consideration by the cloud server when computing solutions for the vehicles. Specifically, the latency may be calculated by comparing timestamps of actions performed by the vehicles. That is, one or more vehicles 390 may transmit a vehicle action (e.g., moving a predetermined distance, stopping at a stop sign, etc.) with a timestamp to the server 100. The server 100 may receive each vehicle action with a timestamp through a methodology such as GPS. Based on the received timestamps, if the calculated latency is greater than or equal to a predetermined threshold (e.g., set by parameters of the server), then a solution may be recalculated in the server 100. Here, for example, the calculated latency being greater than or equal to the predetermined threshold may mean that sensor data received from a vehicle is old or outdated, and the actual position of the vehicle may have changed during the period of latency, thereby making the previous solution calculated for the vehicle to be infeasible. Therefore, a recalculation is performed by the server 100 based on the latest available values of vehicle actions transmitted from the vehicle, and then the recalculated solution (or an updated solution) is transmitted to the vehicle.

In addition, the vehicles may include on-board vehicle sensors that may be used as an emergency response resource in a case where the vehicle's detection units fail to or are unable to account for close range obstacles. In such a case, the server 1N may receive an emergency detection based on the on-board vehicle sensors and a solution may be promptly calculated and transmitted back to the vehicle.

As described above, it is understood that the above-described modules may be distributed across a plurality of servers.

In addition, according to various embodiments of the disclosure, methods and devices disclosed herein may be provided as software of a computer program product. A computer program product may be distributed in the form of a machine readable storage medium (e.g., compact disc read only memory (CD-ROM)) or distributed online through an application store or between two devices directly. In the case of on-line distribution, at least a portion of the computer program product (e.g., a downloadable app) may be stored temporarily or at least temporarily in a storage medium such as a manufacturer's server, a server in an application store, or a memory in a relay server.

Although some example components of the server 100 are described above, it is understood that one or more embodiments of the server 100 are not limited thereto, and the server 100 may include more or less components depending on the need for managing autonomous vehicles.

Figure 3:
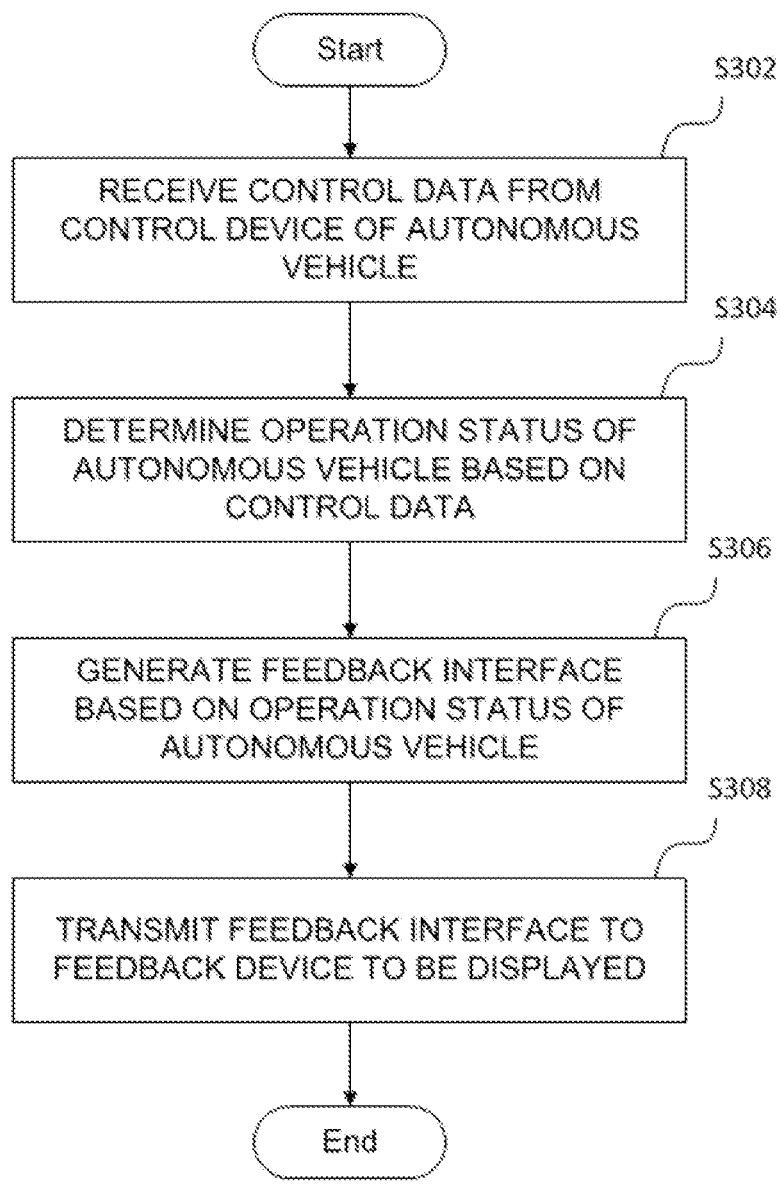
FIG. 3 is a flowchart illustrating a method of providing feedback interface to a feedback device by a server according to an embodiment.

FIG. 3 is a flowchart illustrating a method of providing a feedback interface to a feedback device by a server according to an embodiment.

Referring to FIG. 3, in step S302, the server 100 may receive control data from the control device 300 of the autonomous vehicle 390. The control data may include vehicle data, positioning data, sensor data, and other data related to the functioning of the vehicle. The vehicle data may include attributes of a vehicle, such as a speed, a tire pressure, a fuel level, an engine status, a battery status, a steering angle, a door status, etc. However, the vehicle data described above is not limited thereto, and the vehicle data may include any other attributes that relate to the functioning of a vehicle. The positioning data may include location-based data, such as global positioning system (GPS) data. However, the positioning data described above is not limited thereto, and may include any other data that relates to identifying locations of the vehicle and other objects. The sensor data may include data for tracking and classifying objects based on sensors, such as a LiDAR, a radar and/or a camera. While some example control data are described above, the server 100 may receive any other types of data from the control device 300 that may be relevant to ensuring efficient and safety operations of the autonomous vehicles.

In step S304, the server 100 may determine an operation status of the vehicle based on the received control data. By way of example, an operation of opening a door of the vehicle may be received in the form of the vehicle data from the control device 300.

In step S306, the server may generate a feedback interface based on the determined operation status of the vehicle. The feedback interface is an interface designed to guarantee safe operation of a vehicle and an efficient handling of control commands of a vehicle. For example, the feedback interface may include one or more interactive interfaces corresponding to respective control commands to a vehicle. The feedback interface will be described in more detail below with reference to FIGS. 4-6.

In step S308, the server 100 may transmit the feedback interface to the feedback device 200 (shown in FIG. 1), to be displayed to a user (e.g., a safety operator) of the feedback interface. According to an embodiment, the feedback interface may be only activated when an automation of a control command stops working. According to another embodiment, the feedback interface may be activated when a user of the feedback interface decides to interfere with certain operations of a vehicle. The user of the feedback interface may manually and remotely control certain operations of a vehicle.

Figure 4:
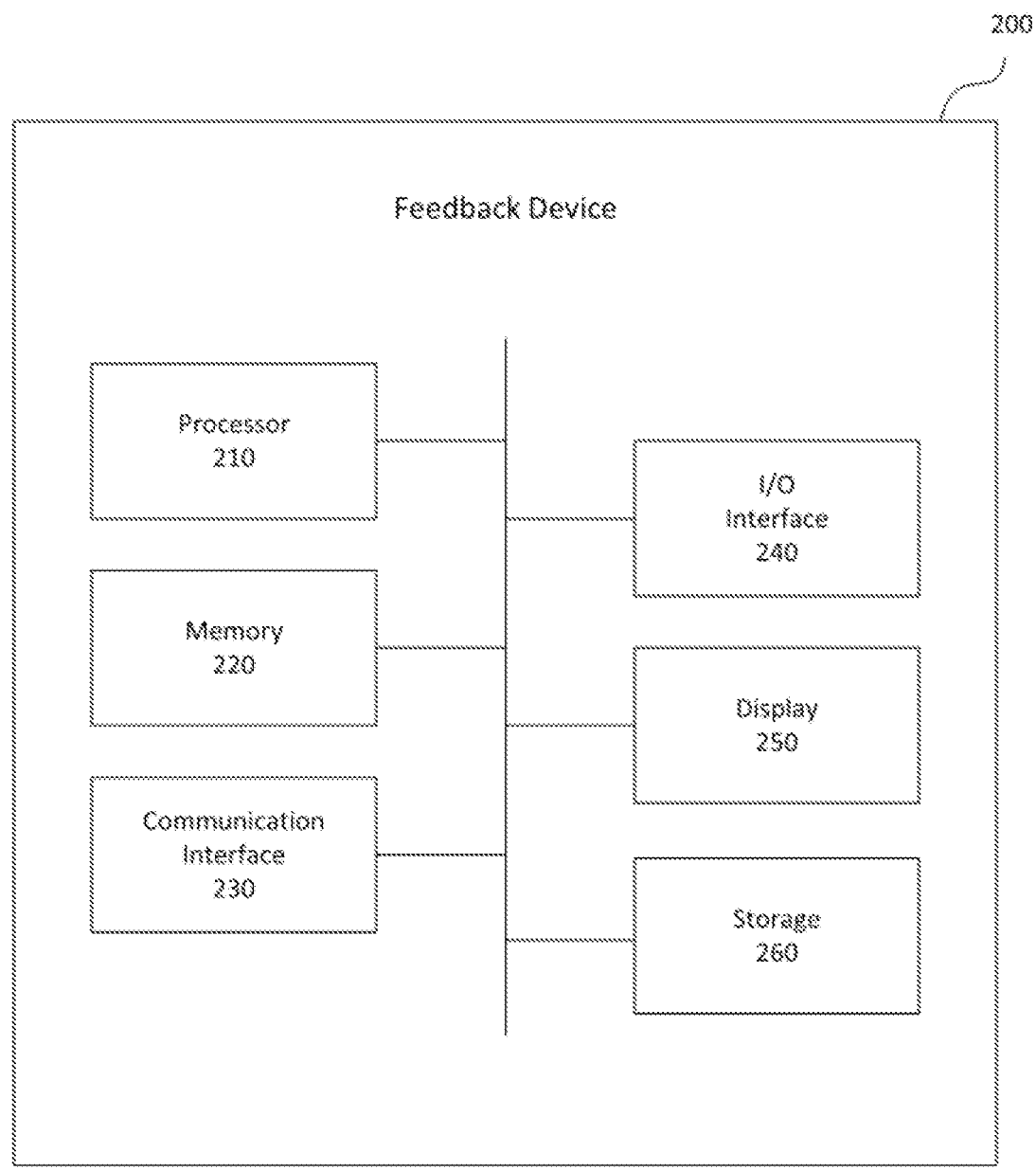
FIG. 4 is a diagram illustrating a feedback device according to an embodiment.

FIG. 4 is a diagram illustrating a feedback device according to an embodiment.

As set forth above, the components or elements of the server 100, the feedback device 200, and the control device 300 may be configured to perform the same or similar functions. Therefore, overlapping descriptions thereof may be omitted.

Referring to FIG. 4, the feedback device 200 may include a processor 210, a memory 220, a communication interface 230, an input/output interface 240, a display 25) and a storage 260. The display 250 may be implemented as a liquid crystal display (LCD) panel, organic light emitting diodes (OLED), a flexible display, a touch screen display, a transparent display, or the like. The processor 210 may control the display 250 to display image signals received from the memory 220 of the feedback device 20 or received from an external device (e.g., the server 100) through the communication interface 230. In addition, the display 350 of the control device 300 (shown in FIG. 7) may be configured to perform the same or similar functions as the display 250 of the feedback device 200. However, the implementations of the displays 250 and 350 are not limited thereto. The feedback device 200 will be described in more detail with reference to FIG. 5 herein below.

Figure 5:
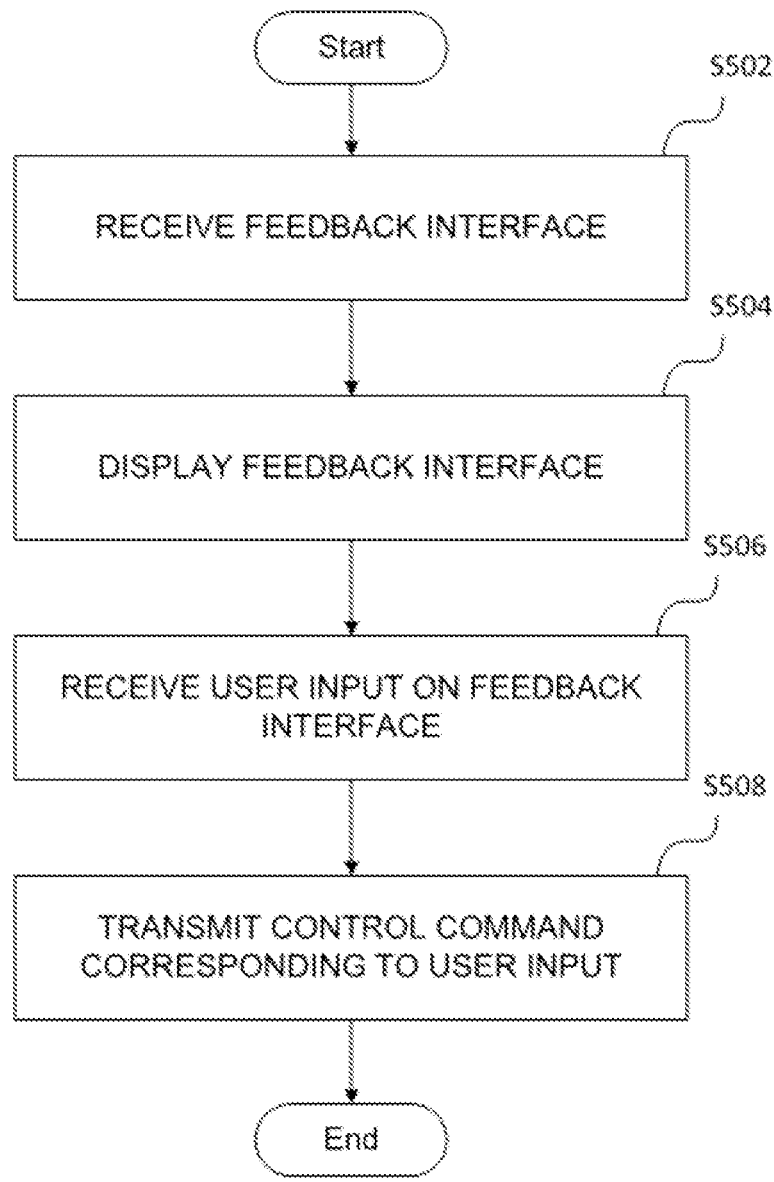
FIG. 5 is a flowchart illustrating a method of performing a control command on an autonomous vehicle based on a user input to a feedback interface according to an embodiment.

FIG. 5 is a flowchart illustrating a method of performing a control command on an autonomous vehicle based on a user input to a feedback interface according to an embodiment.

Referring to FIG. 5, in step S502, the processor 210 may receive a feedback interface from the server 100 through the communication interface 230.

In step S504, the processor 210 may control the display 250 to display the feedback interface received from the server 100. The feedback interface may include interfaces corresponding to a current operation or a metric of a vehicle. Specifically, on the feedback interface, a visual representation of a vehicle and any metric or operation status of the components or parts of the vehicle may be presented. For example, the feedback interface may include a current status of a tire pressure as being 25 Psi. However, one or more embodiments of the disclosure are not limited thereto, and the feedback interface may include other operations or metrics of a vehicle, such as doors/windows, an engine, and any other vehicle/automotive parameters. An exemplary feedback interface will be described in more detail with reference to FIG. 6 herein below.

In step S506, the processor 210 may receive a user input on the feedback interface through the input/output interface 240. Here, a user (e.g., a person responsible for monitoring and controlling management of autonomous vehicles) who is viewing the feedback interface may input a control command on the feedback interface to perform the control command on a vehicle. For example, the user may input a control command to stop the vehicle based on learning from one of the metrics displayed on the feedback interface that the fuel level is low.

In step S508, the processor 210 may transmit a control command input by a user to the server 100 through the communication interface 230. Alternatively, the processor 210 may transmit a control command directly to an autonomous vehicle through the communication interface 230.

Figure 6:
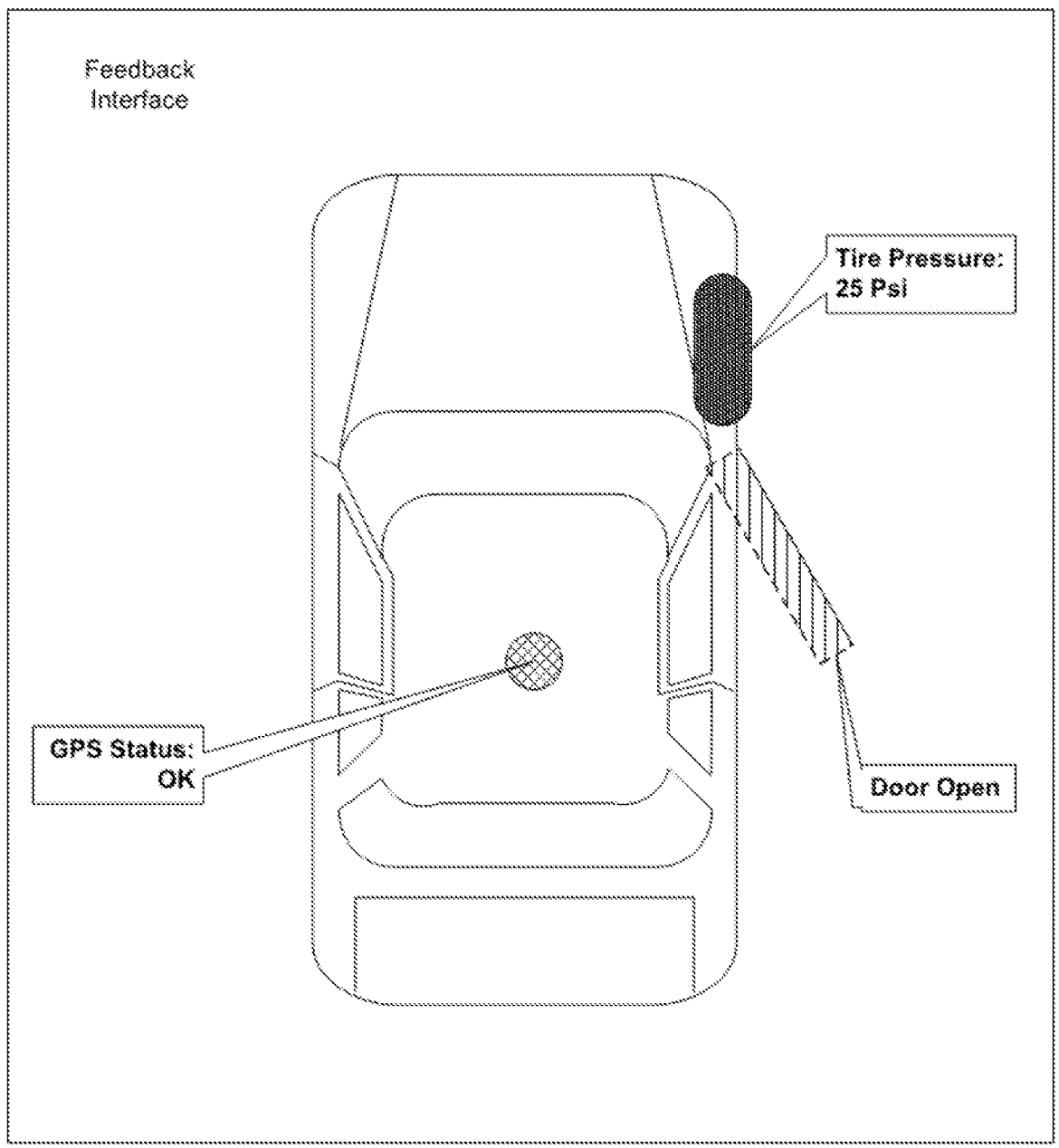
FIG. 6 is a schematic diagram illustrating an exemplary feedback interface according to an embodiment.

FIG. 6 is a schematic diagram illustrating an exemplary feedback interface according to an embodiment.

Referring to FIG. 6, the feedback interface may display a top-view of a vehicle including certain status of an operation or a metric of the vehicle. By way of examples, a tire pressure metric of "25 Psi" may be displayed next to a tire from the top-view of the vehicle to indicate the status of the tire, a GPS status may be displayed on top of the top-view of the vehicle to indicate whether the GPS of the vehicle is functioning properly (e.g., "OK"), and an opened door may be displayed on the top-view of the vehicle to indicate that the door of the vehicle is currently open. However, the layout of the feedback interface is not limited to the above examples. For example, a top-view of the passengers in each seat of the vehicle may be displayed based on a detection of the passengers by an in-vehicle monitoring camera.

In addition, the top-view layout may not only represent a single autonomous vehicle, but may display a plurality of autonomous vehicles in a map view. Here, each vehicle among the plurality of autonomous vehicles may be designated different colors, arrows and patterns to indicate controlled or uncontrolled vehicles. Also, any available routes may be displayed on the top-view of a map, and certain sections of the routes may be highlighted and/or selected to indicate a position of the vehicle on the map and/or routes to be taken by the vehicle. The selection of the routes may be made by simply tapping on a section of the route in a case where the display 250 is a touch screen display, however, a method of receiving a user input by the display 250 is not limited thereto.

Furthermore, a user (e.g., a safety operator) may actively interact with the feedback interface to perform certain operations on the vehicles. The feedback interface may be implemented on a touch screen display. However, one or more embodiments are not limited thereto, and the user may interact with the feedback interface through various other means, such as voice recognition.

As described above, the feedback interface may display a featured map around the vehicle. For example, the feature map may include a parking lot, and the user of the feedback interface may select one of the parked vehicles in the parking lot with a touch on a touch screen display and guide the selected vehicle to be parked at another spot by touching an empty parking spot within the featured map. In addition, the featured map may also display overlays of different routes that may be taken by the selected vehicle and the user may select one of the routes to guide the selected vehicle to travel along the selected route. As another example, the user may select multiple vehicles operating as fleets or delivery vehicles and guide those vehicles to a certain destination (or summon) point shown on the map to pick-up or drop-off an item.

Furthermore, the feedback interface may include other visual highlights based on an execution of a control command and may be based on a heartbeat signal from the vehicle. Here, the term "heartbeat signal" may refer to a signal transmitted from a vehicle indicating that respective function associated with each component or part of the vehicle is operating properly. The heartbeat signal may be obtained by performing periodic sampling on each component or part of the vehicle to determine whether certain component or part of the vehicle has stopped functioning. By way of example, if a heartbeat signal is not received by the server 100 from the control device 300 in one of the vehicles 390, one or more user interfaces (e.g., a button) in the feedback interface may be "greyed" out or deactivated to indicate that a control command relating to certain components or parts of the vehicle cannot be performed. For example, if a certain control command (e.g., a command to change lane) would lead the vehicle to enter an area where a detection unit or a sensor of the vehicle may become unavailable or disabled, such a control command may not be accessible (e.g., "greyed out" on the feedback interface) to the user of the feedback interface so as to prevent the detection unit or the sensor of the vehicle becoming disabled. This feature may be referred to as "Command Denial at Source."

According to an embodiment, when one or more control commands are being rejected by the control device 300 of the vehicle 390, which will described in detail below with reference to FIG. 10, the feedback interface may grey out one or more interfaces that correspond to the one or more control commands being rejected by a user of the control device 300. As another example, when the vehicle is currently executing a control command, the feedback interface may change a color of an interface (e.g., a button) corresponding to the control command, to turn yellow, where a yellow button would indicate the control command is currently being executed in the vehicle.

Furthermore, the feedback interface may display one or more interfaces taking into account for latency of issuing one or more control commands. That is, a user of the feedback interface may be informed of the latency via sequence of blinks of an interface to indicate the latency of the control command. Here, the sequence of blinks on the interface corresponding to the control command may eventually turn to a green color to indicate the operational status of the control command on the vehicle. However, for example, if there is an obstacle that hinders the completion of the control command, then the interface may turn red to indicate that the control command is still in a queue of the memory 220 waiting to be executed.

Although some examples of the feedback interface are described above, one or more embodiments of the feedback interface are not limited thereto.

Figure 7:
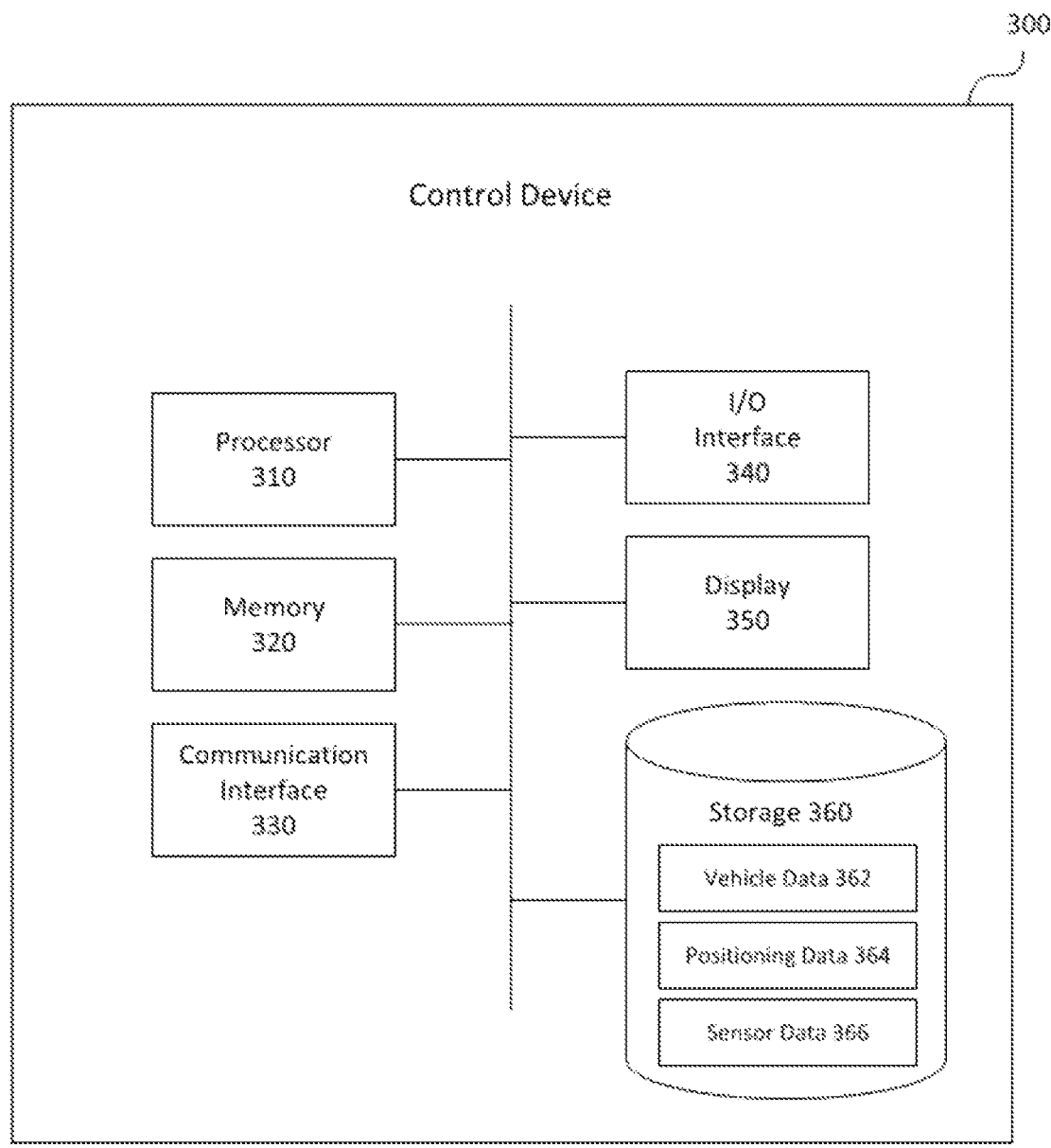
FIG. 7 is a diagram illustrating a control device according to an embodiment.

FIG. 7 is a diagram illustrating a control device according to an embodiment.

As described, the components or elements of the server 100, the feedback device 20X), and the control device 300 may be configured to perform the same or similar functions. Therefore, overlapping descriptions thereof may be omitted herein below.

Referring to FIG. 7, the control device 300 may include a processor 310, a memory 320, a communication interface 330, an input/output interface 340, a display 350 and a storage 360. The storage 360 may include control data such as vehicle data 362, positioning data 364 and sensor data 366. The vehicle 362 data may include data relating to attributes of a vehicle, such as a speed, a tire pressure, a fuel level, an engine status, a battery status, a steering angle, a door status, etc. The positioning data 364 may include location-based data, such as global positioning system (GPS) data. The sensor data 366 may include data for tracking and classifying objects based on sensors, such as a LiDAR, a radar and a camera. While some examples of control data are described above, one or more embodiments are not limited thereto, and the storage 360 may store any other data that may be relevant to ensuring efficient and safety operations of the autonomous vehicles.

The control device 300 may be implemented in each vehicle among the plurality of vehicles 391 (shown in FIG. 1). Alternatively or additionally, the control device 3M) may be separated from the vehicle. For example, the control device 3M) may be implemented on a terminal device (e.g., a cell phone) that may be configured to control operations of the vehicle.

Figure 8:
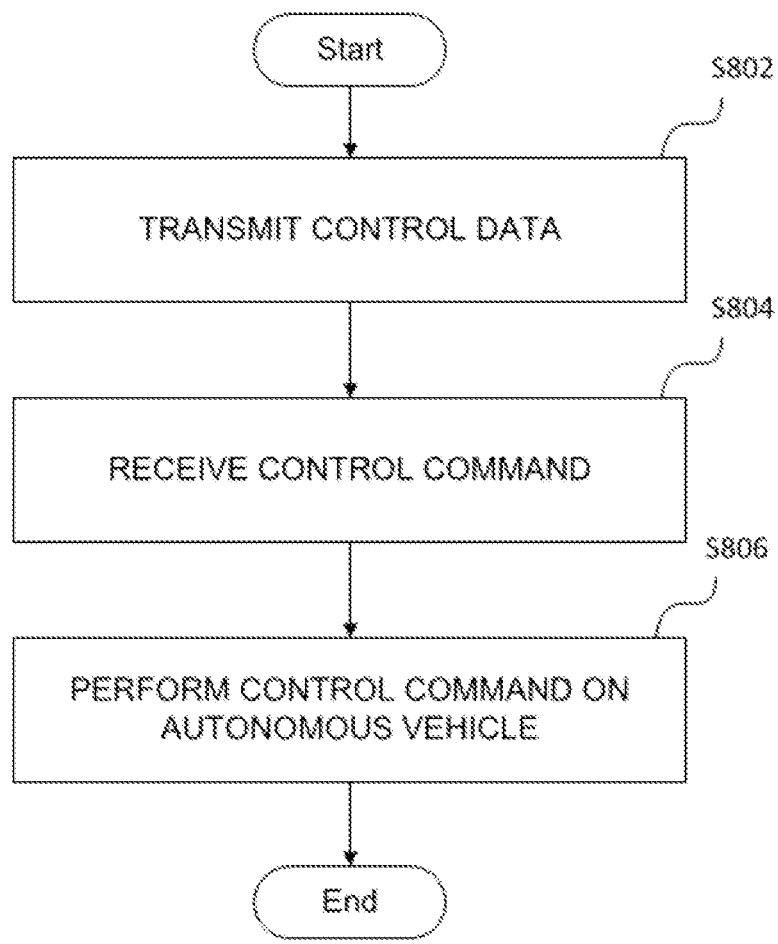
FIG. 8 is a flowchart illustrating a method performing a control command according to an embodiment.

FIG. 8 is a flowchart illustrating a method performing a control command according to an embodiment.

Referring to FIG. 8, in step S802, the processor 310 may transmit control data (e.g., vehicle data, positional data, and sensor data) to the server 100 through the communication interface 330. However, one or more embodiments are not limited thereto, and the processor 310 may transmit any other data to the server 100 to ensure efficient and safe operations of the autonomous vehicles.

In step S804, the processor 310 may receive at least one control command from the server 100 through the communication interface 330. Here, at least one control command may be generated based on computations performed by various modules (e.g., the priority module 162, the path minimization module 164, the time scheduling module 166) included the server 100, and may instruct certain operations to be automatically performed on the vehicle. However, the embodiment is not limited thereto, and the processor 310 may also receive the at least one control command directly from the feedback device 200 through the communication interface 330.

In step S806, the processor 310 of the control device 300 may instruct various components or parts of the vehicle to perform the received control command.

Figure 9:
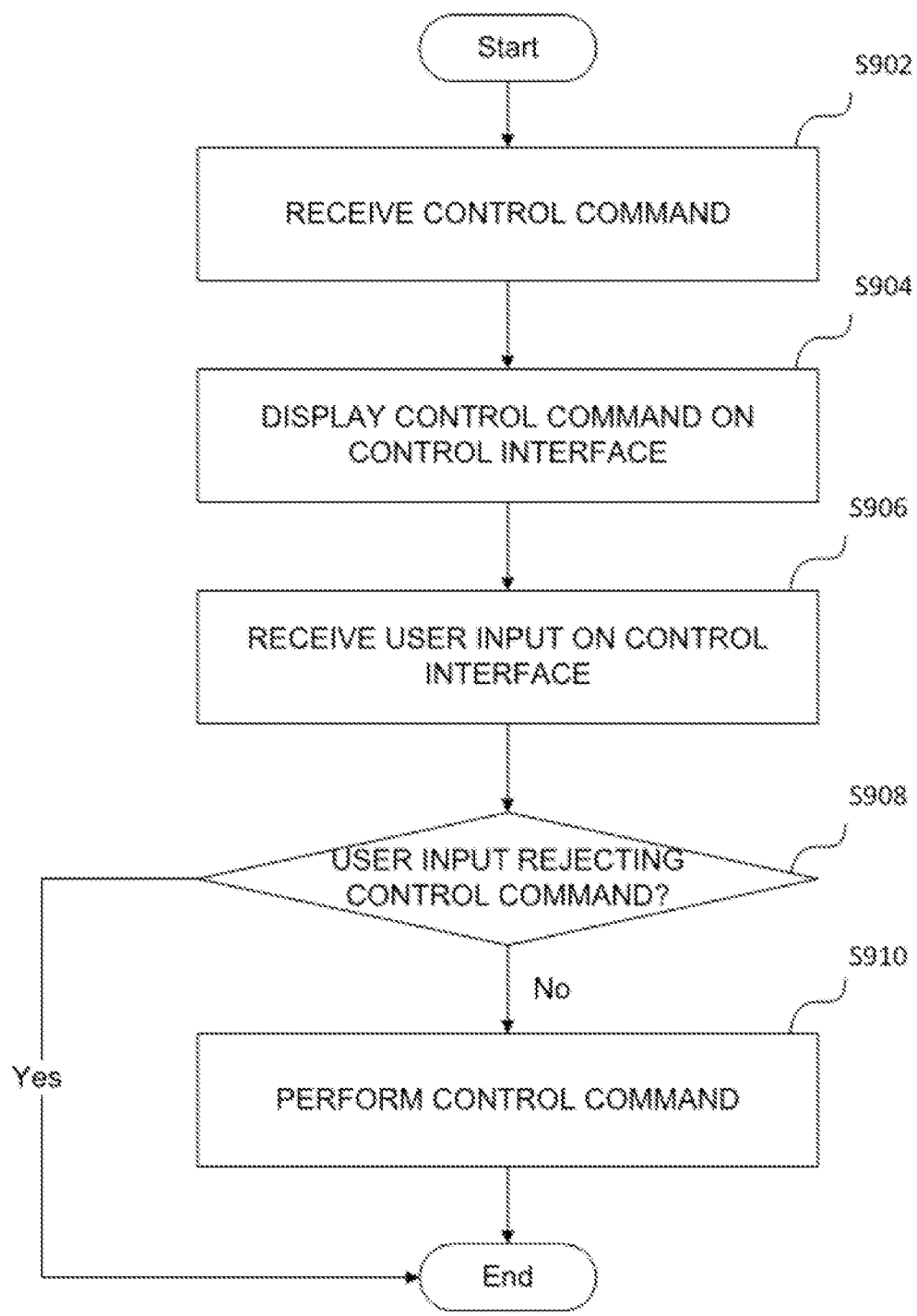
FIG. 9 is a flowchart illustrating a method of performing a control command according to another embodiment.

FIG. 9 is a flowchart illustrating a method of performing a control command according to another embodiment.

Referring to FIG. 9, in step S902, the processor 310 of the control device 300 may receive at least one control command from at least one of the server 100 or the feedback device 200.

In step S904, the processor 310 may control the display 350 to display the received control command on a control interface. Here, the control interface may also include other executable buttons or interfaces. For example, the control interface may include an in-built rejection interface (shown in FIG. 10), so as to receive a user input with respect to the displayed control command. The in-built rejection system will be described in more detail below with reference to FIG. 10. However, one or more embodiments are not limited thereto, and the control interface may include any other interfaces that may be relevant to ensuring efficient and safe operations of the autonomous vehicles.

In step S906, the processor 310 may receive a user input on the control interface through the input/output interface 340.

In step S908, the processor 310 may determine whether the received user input on the control interface is rejecting the received control command. If the user input rejects the received control command (step S908: Yes), then the control command is not performed on the vehicle. However, if the user input does not reject the control command (step S908: No), then the control command may be automatically performed on the vehicle. However, one or more embodiments are not limited thereto. For example, in a case where the user is inactive, and the control interface does not receive any user input from the user for a predetermined time period, then the control command may be automatically executed on the vehicle. Alternatively, in the same scenario as described above, when the control interface does not receive any user input for the predetermined time period, then the control command may not be executed.

Figure 10:
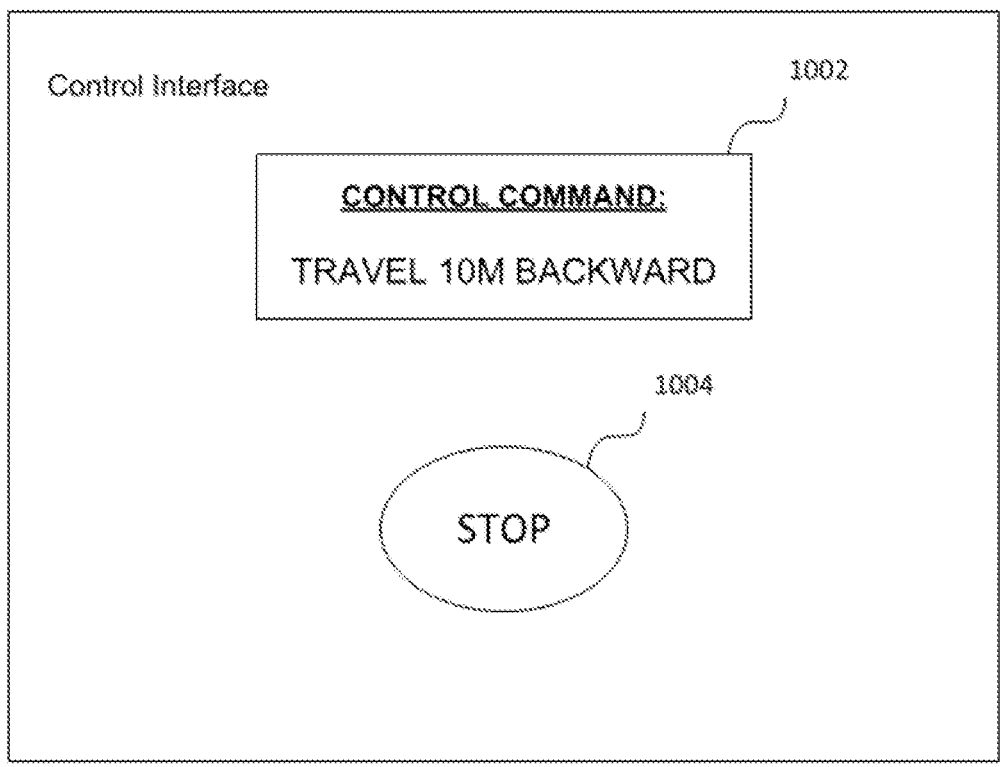
FIG. 10 is a schematic diagram illustrating an exemplary control interface according to an embodiment.

FIG. 10 is a schematic diagram illustrating an exemplary control interface according to an embodiment.

Referring to FIG. 10, the control device 300 may include an in-built rejection system in which a user of the control device 300 may reject a control command issued by the feedback device 200 or the server 100. Here, the processor 310 of the control device 300 may control the display 350 to display the control interface shown in FIG. 10. The control interface may include an interface 1002 displaying the issued control command by the feedback device 200 or the server 100 and an interface 1004 for receiving an input from the user of the control device 300 to reject the control command. By way of example, when the issued control command is to travel 10 m backward, the user of the control device 300 may stop the automatic execution of such control command by touching or pressing the "stop" interface 1004 to stop the automatic execution of the control command of travelling 10 m backward. Here, the user may be provided with this in-built rejection system to control any inaccurate automatic execution of a control command in which a pedestrian or another object may be at risk due to such control command. However, one or more embodiments are not limited thereto, and the control interface may include various interfaces to provide in-built rejection interface. For example, the in-built rejection system may also interact with a user through an audio signal in which the user can reject control commands by way of speaking to a microphone.

Furthermore, the in-built rejection system may be applied to one or more commands. The in-built rejection system may detect multiple similar commands received within a predetermined period. For example, the in-built system may detect multiple similar commands within a predetermined period of 'x', where 'x' is directly proportional to a factor that accounts for both an acceleration and a velocity of a vehicle. This relationship may be expressed in Equation (1) as follows:

$$X = Av + Ba \quad (1)$$

Here, "v" is a velocity of a vehicle, "a" is a lateral acceleration of the vehicle, and "A" and "B" are fixed constants.

According to an embodiment, when multiple distinct and directly contradicting commands may be received in the period of "x," the in-built rejection system of the control device 300 may be configured to automatically reject at least one of the multiple commands. For example, if a first control command and a second control command are received with the period "x," the second control command may be automatically rejected, where the second control command is received after the first control command.

By way of example, when the control device 300 receives a first control command to travel straight and a second control command to change lane, the second control command may be automatically rejected.

According to another embodiment, the in-built rejection system may take into consideration the vicinity of a vehicle. The vicinity of a vehicle may include one or more objects or obstacles (e.g., a pedestrian or another vehicle), and may be determined based on a distance from the vehicle to the one or more other objects or obstacles and a relative velocity of the vehicle with respect to the one or more other objects. The vicinity of a vehicle may be calculated according to Equation (2) as follows:

$$V = Cv + Dd \quad (2)$$

Here, "v" is a relative velocity, "d" is a distance from the vehicle to another object, and "C" and "D" are fixed constants.

By way of example, in the same case described above, when the control device 300 receives the first control command to travel straight and the second control command to change lane, the in-built rejection system may calculate the vicinity of the vehicle and determine whether there are any other objects in the vicinity of the vehicle. Based on determining that there is an object in the vicinity, the in-built rejection system may reject the second control command to change lane because executing the second control command may cause a collision between the vehicle and the detected object.

Although some example operations of the in-built rejection system are described above, one or more embodiments are not limited thereto. For example, control commands may be rejected based on vehicle dynamics feasibility. That is, when control commands are issued to abruptly change a direction of a vehicle, perform a lane change at a higher speed or perform an action that is not feasible according to a load characteristic of a semi-truck vehicle, such control commands may be infeasible and thus, may be rejected by the in-built rejection system of the control device 300. Some exemplary embodiments of the in-built rejection system are described above. However, the in-built rejection system is not limited thereto, and certain control commands may be rejected by the in-built rejection system according to a geo-fencing technology.

The exemplary embodiments of the disclosure have been shown and described above, however, the embodiments of the disclosure are not limited to the aforementioned specific embodiments. It may be understood that various modifications, substitutions, and improvements can be made by those having ordinary skill in the art in the technical field to which the disclosure belongs, without departing from the spirit and scope of the disclosure as claimed by the appended claims. It should be understood that such modifications, substitutions, and improvements shall fall within the protection scope of the disclosure, and should not to be construed independently from the technical idea or prospect of the disclosure.

What is claimed is:

1. A central management system for managing autonomous vehicles comprising a feedback device and a control device,
   wherein the feedback device comprises:
   a display;
   a communication interface configured to communicate with a server and the control device of each of a plurality of vehicles; and
   a processor configured to:
      receive a feedback interface from the server;
      control the display to display the feedback interface;
      receive a user input on the feedback interface; and
      transmit a control command corresponding to the user input to the control device of each of the plurality of vehicles, and
   wherein, when the control device receives a first control command and a second control command within a preset time duration and the second control command contradicts the first control command, the control device is configured to automatically reject the second control command.

2. The central management system of claim 1, wherein the control device is configured to automatically reject the second control command that is received after the first control command within the preset time duration.

3. The central management system of claim 1, wherein, when the first control command and the second control command that are received within the preset time duration contradict each other, the control device is configured to calculate a vicinity of each of the plurality of vehicles, determine whether there is any object in the vicinity of each of the plurality of vehicles, and automatically reject the second control command which, when executed, causes a collision between at least one vehicle of the plurality of vehicles and the object.

4. The central management system of claim 3, wherein the feedback interface activates or deactivates one or more interfaces based on a heartbeat signal indicating an operating status of one or more components of at least one vehicle among the plurality of vehicles.

5. The central management system of claim 1, wherein the feedback interface further comprises an operation status of one or more components of at least one vehicle among the plurality of vehicles.

6. The central management system of claim 1, wherein the feedback interface further comprises an image or a metric for one or more components of at least one vehicle among the plurality of vehicles.

7. The central management system of claim 6, wherein the image of the at least one vehicle is a top-view of the at least one vehicle.

8. The central management system of claim 1, wherein the feedback interface activates or deactivates one or more interfaces based on the control command being executed by the control device of each of the plurality of vehicles.

9. The central management system of claim 1, wherein the feedback interface configures one or more interfaces to blink based on a latency of transmitting the control command.

10. The central management system of claim 1, wherein the feedback interface further comprises a map view of the plurality of vehicles.

11. A method of controlling a feedback device and a control device connected to a server, the method comprising:
   receiving a feedback interface from the server by the feedback device;
   controlling a display to display the feedback interface on the feedback device;
   receiving a user input on the feedback interface;
   transmitting a control command corresponding to the user input from the feedback device to the control device of each of a plurality of vehicles; and
   when the control device receives a first control command and a second control command within a preset time duration, and the second control command contradicts the first control command, automatically rejecting the second control command, by the control device.

12. The method of claim 11, wherein the control device is configured to automatically reject the second control command that is received after the first control command within the preset time duration.

13. The method of claim 12, wherein the feedback interface activates or deactivates one or more interfaces based on a heartbeat signal indicating an operating status of one or more components of at least one vehicle of the plurality of vehicles.

14. The method of claim 11, wherein, when the first control command and the second control command that are received within the preset time duration contradict each other, the control device is configured to calculate a vicinity of each of the plurality of vehicles, determine whether there is any object in the vicinity of each of the plurality of vehicles, and automatically reject the second control command which, when executed, causes a collision between at least one vehicle of the plurality of vehicles and the object.

15. The method of claim 11, wherein the feedback interface activates or deactivates one or more interfaces based on the control command being executed by the control device of each of the plurality of vehicles.

16. The method of claim 11, wherein the feedback interface configures one or more interfaces to blink based on a latency of transmitting the control command.

17. A server comprising:
   a communication interface configured to communicate with a control device of each of a plurality of vehicles and a feedback device;

a memory storing instructions; and at least one processor configured to:
- receive control data from the control device of each of the plurality of vehicles;
- determine an operation status of each of the plurality of vehicles based on the control data;
- generate a feedback interface based on the operation status of each of the plurality of vehicles;
- transmit the feedback interface to the feedback device;
- based on a timestamp being received together with each vehicle action from the plurality of vehicles, re-determine the operation status of each vehicle when the timestamp becomes outdated, and automatically modify the feedback interface based on the re-determined operation status of each vehicle.

18. The server of claim 17, wherein the at least one processor is configured to execute:
- a priority module configured to determine a priority of each of the plurality of vehicles to be moved;
- a path minimization module configured to minimize a path distance for each of the plurality of vehicles from a first location to a second location; and
- a time scheduling module configured to obtain a schedule delivery time for each of the plurality of vehicles and determine a schedule time to be deployed for each of the plurality of vehicles.

19. The server of claim 17, wherein the control data comprises at least one of vehicle data, positioning data or sensor data.

20. The server of claim 18, wherein the priority module is further configured to assign the priority of the plurality of vehicles based on at least one of an urgency of an item being carried in a vehicle, a duration of the item carried in the vehicle, or a maximum time for delivery assigned to the item or a passenger in the vehicle.

* * * * *